United States Patent
Park et al.

(10) Patent No.: US 12,255,301 B2
(45) Date of Patent: Mar. 18, 2025

(54) BATTERY MODULE HAVING GAS VENTING CHANNEL COMBINED WITH COOLING CHANNEL, BATTERY PACK INCLUDING THE SAME, AND METHOD FOR MANUFACTURING THE BATTERY MODULE

(71) Applicant: LG ENERGY SOLUTION, LTD., Seoul (KR)

(72) Inventors: Ju-Hun Park, Daejeon (KR); Kwang-Mo Kim, Daejeon (KR); Jun-Yeob Seong, Daejeon (KR); Hye-Mi Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/712,633

(22) PCT Filed: May 3, 2023

(86) PCT No.: PCT/KR2023/006067
§ 371 (c)(1),
(2) Date: May 22, 2024

(87) PCT Pub. No.: WO2023/229254
PCT Pub. Date: Nov. 30, 2023

(65) Prior Publication Data
US 2024/0332668 A1 Oct. 3, 2024

(30) Foreign Application Priority Data
May 24, 2022 (KR) .......................... 10-2022-0063317

(51) Int. Cl.
*H01M 10/6556* (2014.01)
*H01M 10/613* (2014.01)
*H01M 10/6568* (2014.01)
*H01M 50/367* (2021.01)

(52) U.S. Cl.
CPC ..... *H01M 10/6556* (2015.04); *H01M 10/613* (2015.04); *H01M 10/6568* (2015.04); *H01M 50/367* (2021.01)

(58) Field of Classification Search
CPC .......... H01M 10/6556; H01M 10/613; H01M 10/6568; H01M 50/367
See application file for complete search history.

(56) References Cited

U.S. PATENT DOCUMENTS

| 2017/0077566 A1* | 3/2017 | Mascianica ....... H01M 10/6556 |
| 2019/0288256 A1* | 9/2019 | Qin ..................... H01M 50/367 |
| 2020/0194750 A1 | 6/2020 | Kawano |
| 2023/0216106 A1* | 7/2023 | Pröll ................. H01M 10/6563 |
| | | 429/120 |
| 2023/0246289 A1* | 8/2023 | Pröll ................... H01M 50/209 |
| | | 429/82 |

FOREIGN PATENT DOCUMENTS

| KR | 10-1996-0024206 A | 7/1996 |
| KR | 10-2011-0042119 A | 4/2011 |
| KR | 10-2015-0017402 A | 2/2015 |
| KR | 10-2015-0118375 A | 10/2015 |
| KR | 10-1615941 B1 | 4/2016 |
| KR | 10-1743697 B1 | 6/2017 |
| KR | 10-1799238 B1 | 11/2017 |
| KR | 10-2142323 B1 | 8/2020 |
| KR | 10-2021-0051543 A | 5/2021 |
| KR | 10-2021-0133533 A | 11/2021 |
| KR | 10-2022-0040751 A | 3/2022 |

OTHER PUBLICATIONS

International Search Report (PCT/ISA/210) issued in PCT/KR2023/006067 mailed on Aug. 2, 2023.
Written Opinion (PCT/ISA/237) issued in PCT/KR2023/006067 mailed on Aug. 2, 2023.

* cited by examiner

*Primary Examiner* — Muhammad S Siddiquee
(74) *Attorney, Agent, or Firm* — Birch, Stewart, Kolasch & Birch, LLP

(57) ABSTRACT

A battery module includes a plurality of battery cells; a module case accommodating the plurality of battery cells and having a gas venting hole on at least one side; and a cooling and venting unit including a gas venting channel and a cooling channel integrally formed in a single body, and disposed on an outer side of the module case, wherein the gas venting channel forms a movement path of gas in communication with the gas venting hole, and the cooling channel forms a movement path of a cooling medium.

19 Claims, 8 Drawing Sheets

BATTERY MODULE HAVING GAS VENTING CHANNEL COMBINED WITH COOLING CHANNEL, BATTERY PACK INCLUDING THE SAME, AND METHOD FOR MANUFACTURING THE BATTERY MODULE

CROSS REFERENCE TO RELATED APPLICATIONS

This application is the National Phase of PCT International Application No. PCT/KR2023/006067, filed on May 3, 2023, which claims priority under 35 U.S.C. 119(a) to Patent Application No. 10-2022-0063317, filed in Republic of Korea on May 24, 2022, all of which are hereby expressly incorporated by reference into the present application.

TECHNICAL FIELD

The present disclosure relates to a battery module, and more particularly to, a battery module in which a cooling device for dissipating heat generated from the battery module and a gas venting device for gas venting in the event of thermal runaway are formed into a single component.

BACKGROUND ART

Secondary batteries are attracting attention as a new source of energy with eco-friendliness and energy efficiency since they notably reduce fossil fuel use and do not produce by-products from the use of energy.

Accordingly, the use of secondary batteries in various types of devices is increasing. For example, secondary batteries are being used as a source of energy for not only small multifunctional products such as wireless mobile devices or wearable devices but also electric vehicles and hybrid electric vehicles proposed as an alternative to gasoline vehicles and diesel vehicles or energy storage systems (ESSs).

Lithium secondary batteries used widely in recent years have the operating voltage of about 2.5V to 4.5V of each battery. Accordingly, electric vehicles or energy storage systems requiring large capacity and high output use, as a source of energy, a battery module including lithium secondary batteries connected in series and/or in parallel and a battery pack including battery modules connected in series and/or in parallel.

The number of lithium secondary batteries in one battery module or the number of battery modules in one battery pack may increase according to the output or capacity of the battery pack required for electric vehicles.

In case where a fire and explosion occurs, damage to the battery pack including the plurality of lithium secondary batteries may be more serious.

For example, when an event such as a short between the lithium secondary batteries or an abnormal temperature rise occurs in a certain battery module, a large amount of venting gas may be produced in the lithium secondary batteries, and when degradation gets worse, flames and high temperature sparks including electrode active materials and aluminum particles may occur, and the flames and high temperature sparks may erupt from the corresponding battery module along with venting gas. The erupting flames and high temperature sparks cause thermal damage to the other battery modules adjacent to the battery module in which the fire occurred, accelerating the spread of the fire to the other battery modules.

Accordingly, because ensuring fire safety is important to the battery pack for vehicles, it is necessary to vent the venting gas out of the battery module while preventing the flames or sparks from escaping to prevent or delay fire propagation or explosion risks of the battery modules. Moreover, it is important to keep battery cells at optimum temperature by dissipating heat generated from the battery cells during charging/discharging.

To this end, the battery module includes a gas venting device and a cooling device. For example, as shown in FIG. 1, the gas venting device 2 may be configured such that it is mounted on top of the battery module 1 and the inside of the gas venting device 2 is in communication with the inside of the battery module 1. The gas venting device 2 serves to vent gas while suppressing leakage of flames in the event of fire in the battery module 1. Additionally, the cooling device 3 is mounted on bottom of the battery module 1, has a flow channel for the flow of cooling water inside, and is configured to absorb heat from battery cells by indirect contact between the cooling water and the battery cells.

However, applying the gas venting device 2 and the cooling device 3 which are separate and distinct components to each battery module is inefficient from the perspective of process/cost/tact time/size optimization of the battery module.

Accordingly, there is a need for the development of a new single component having a combined structure of the two distinct components, the gas venting device and the cooling device, to simplify an assembly process of the battery module and reduce the cost and time, and the volume of the final product.

DISCLOSURE

Technical Problem

The present disclosure is designed to solve the above-described problem, and therefore the present disclosure is directed to providing a battery module with a new single component into which a gas venting device and a cooling device are combined and a method for manufacturing the battery module.

The technical problem to be solved by the present disclosure is not limited to the above-described problems, and these and other problems will be clearly understood by those skilled in the art from the following description.

Technical Solution

A battery module according to the present disclosure may include a plurality of battery cells: a module case accommodating the plurality of battery cells and having a gas venting hole on at least one side; and a cooling and venting unit including a gas venting channel and a cooling channel integrally formed in a single body, and disposed on an outer side of the module case, wherein the gas venting channel forms a movement path of gas in communication with the gas venting hole, and the cooling channel forms a movement path of a cooling medium.

The cooling and venting unit may include a channel plate having the gas venting channel in a first surface and the cooling channel in a second surface opposite the first surface; and a cover plate covering one of the first surface and the second surface and coupled to the channel plate.

The first surface may have a embossed portion convexly protruding in a predetermined area, and the gas venting channel may be provided in an area surrounded by the embossed portion.

The cooling channel may be formed in the second surface opposite the embossed portion of the first surface, and may be concavely recessed in the second surface along a shape of the embossed portion.

The channel plate may be made of a metal.

The cover plate may cover the first surface of the channel plate, and the second surface of the channel plate may face an outer surface of the module case.

The cooling and venting unit may have a gas inlet, through which a portion of the channel plate contacting the outer surface of the module case is open, so that the gas inlet matches the gas venting hole of the module case.

The gas inlet and the gas venting channel may be in communication with each other, and the gas venting channel may have a path which is extended in a serpentine pattern from a first end of the channel plate to a second end of the channel and a gas outlet in communication with an outside of the module case may be provided at the second end.

The cooling and venting unit may include a cooling medium inlet on a first side of the cooling channel and a cooling medium outlet on a second side of the cooling channel.

The cooling medium inlet or the cooling medium outlet may be formed by a gap between an edge of the channel plate and the outer surface of the module case.

The cooling and venting unit may be coupled to a top of the module case.

The cooling and venting unit may be coupled to at least one side of the module case.

According to another aspect of the present disclosure, there may be provided a battery pack including the above-described battery module.

According to still another aspect of the present disclosure, there may be provided a method for manufacturing the battery module, including: receiving the plurality of battery cells in the module case: preparing the cooling and venting unit; and coupling the cooling and venting unit to an outer surface of the module case, wherein the preparing of the cooling and venting unit includes a stamping process of placing a flat metal plate between an upper mold and a lower mold, and pressing the metal plate in a vertical direction using the upper mold and the lower mold to form a channel plate including the gas venting channel in a first surface of the metal plate and the cooling channel in a second surface of the metal plate so as to form the channel plate.

The preparing of the cooling and venting unit may further include a process of attaching a cover plate to one surface of the channel plate.

The coupling may include a process of attaching the cooling and venting unit to the outer surface of the module case having the gas venting hole using at least one coupling method of welding, bolting, hooking or adhesion.

The gas venting channel may include a first section and a second section, the second section being wider than the first section, wherein a protrusion is formed in the second section to form two branches in the second section.

The cooling channel may have a pair of inlets, wherein the cover plate has a bent portion extending downwardly from an edge of the cover plate, the bent portion being between the pair of inlets.

The battery module may have a gas inlet between the pair of inlets, wherein the bent portion forms a front surface of the gas venting channel.

The plate may form a top surface of the gas venting channel, wherein a surface of the module case forms a bottom surface of the cooling channel.

The cooling channel may have an inlet, wherein a connection port covers the inlet, the connection port configured to connect to a cooling medium supply line.

Advantageous Effects

According to an aspect of the present disclosure, it may be possible to provide the battery module with the new single component into which the gas venting device and the cooling device are combined.

More specifically, when compared with the battery module including the gas venting device and the cooling device as separate and distinct components, the cooling and venting unit into which the gas venting device and the cooling device are combined according to the present disclosure may simplify the assembly process of the battery module and reduce the cost and time and the volume of the final product.

The effect of the present disclosure is not limited to the above-described effects, and these and other effects will be clearly understood by those skilled in the art from this disclosure and the accompanying drawings.

BEST MODE

Hereinafter, exemplary aspects of the present disclosure will be described in detail with reference to the accompanying drawings. Prior to the description, it should be understood that the terms or words used in the specification and the appended claims should not be construed as limited to general and dictionary meanings, but rather interpreted based on the meanings and concepts corresponding to the technical aspect of the present disclosure on the basis of the principle that the inventor is allowed to define terms appropriately for the best explanation. Therefore, the aspects described herein and illustrations in the accompanying drawings are exemplary aspects of the present disclosure to describe the technical aspect of the present disclosure and are not intended to be limiting, and thus it should be understood that a variety of other equivalents and modifications could have been made at the time that the application was filed.

Figure 2:
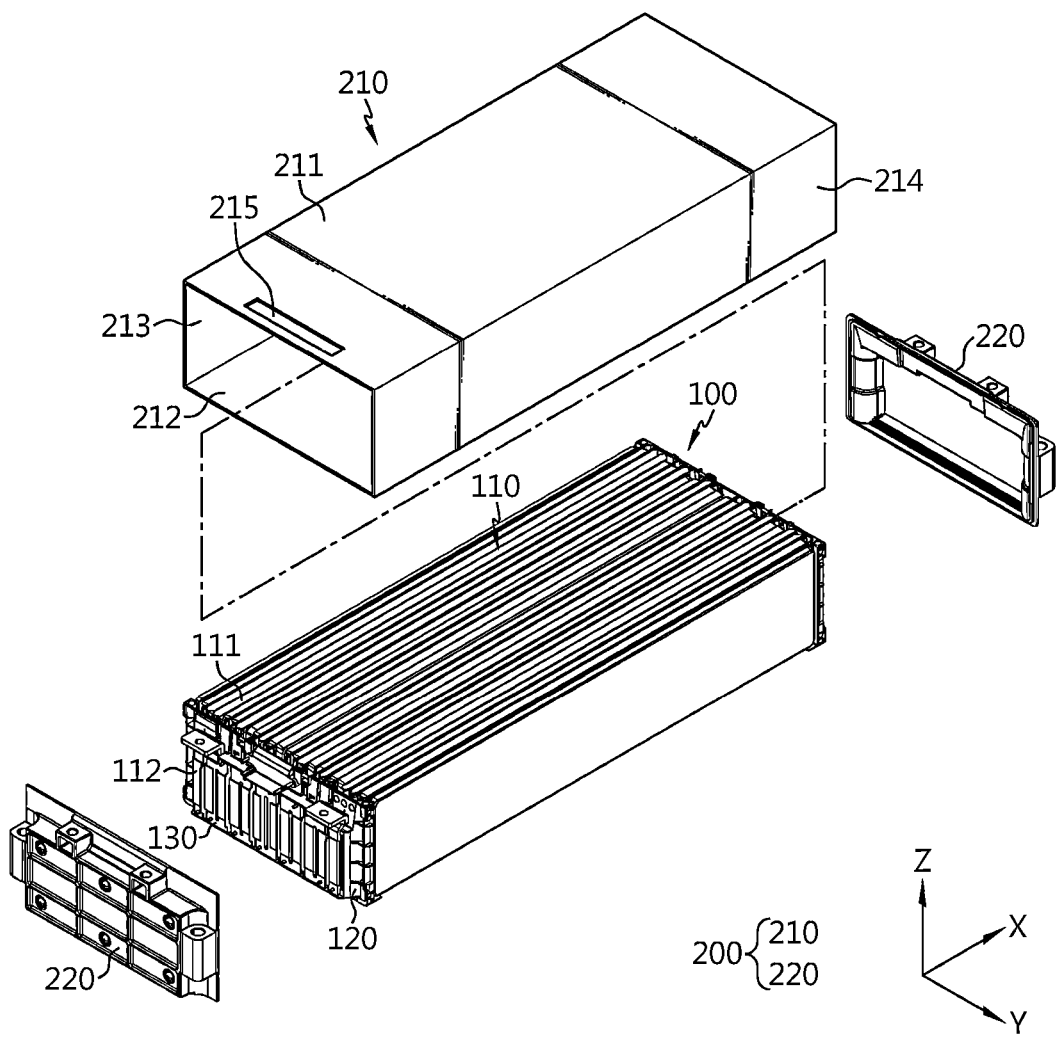
FIG. 2 is a partial exploded perspective view of a battery module except a cooling and venting unit according to an aspect of the present disclosure.
Figure 3:
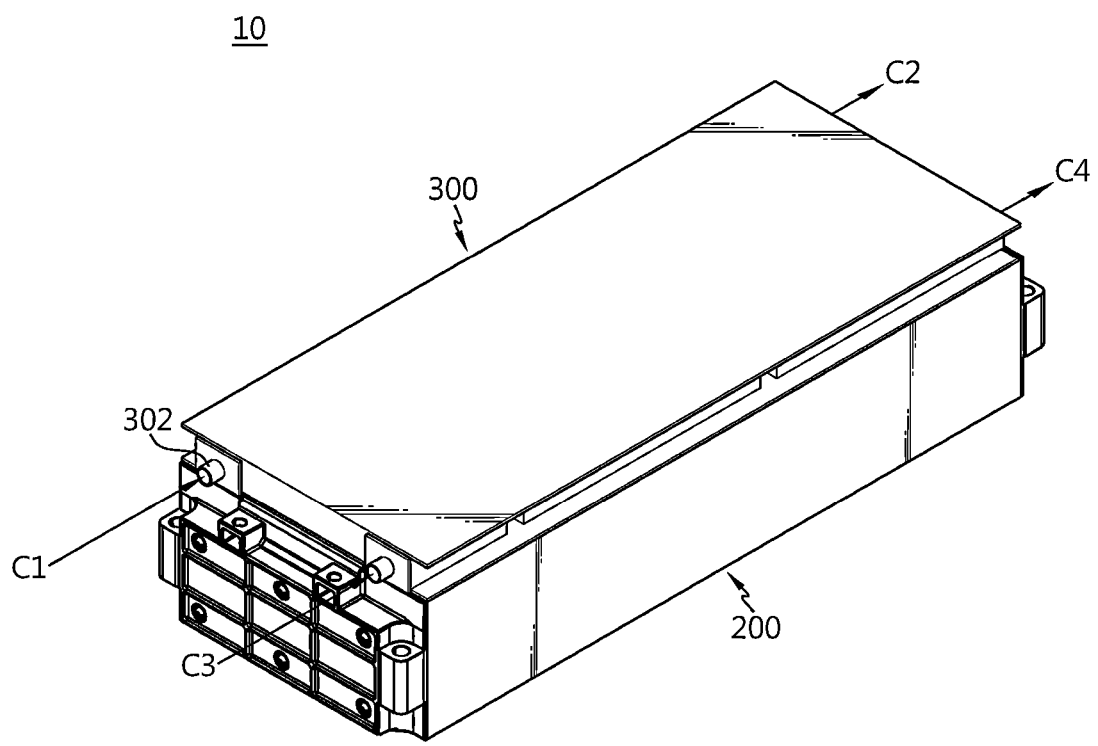
FIG. 3 is a perspective view of a battery module according to an aspect of the present disclosure.
Figure 4:
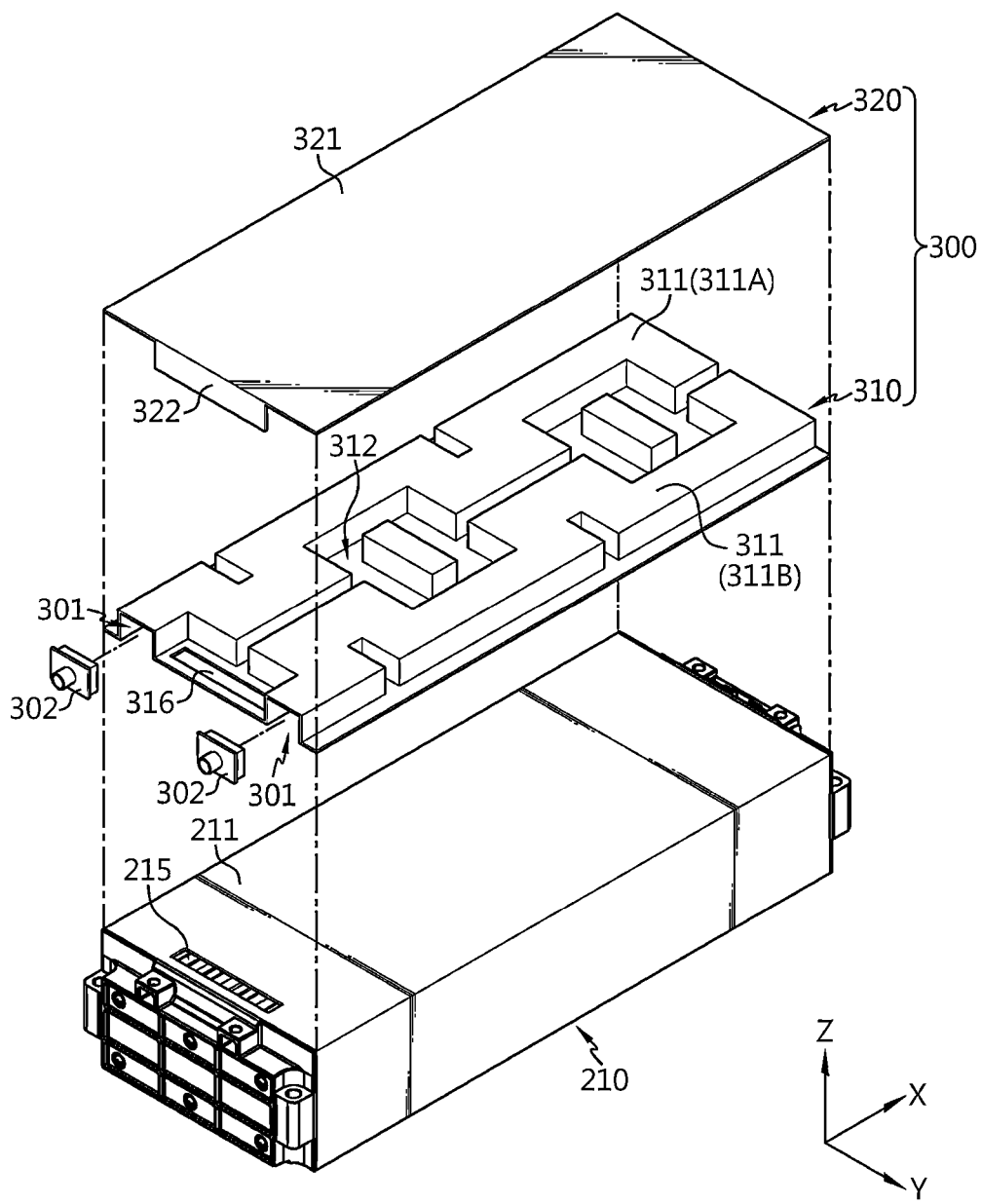
FIG. 4 is an exploded perspective view of a cooling and venting unit in the battery module of FIG. 3.

FIG. 2 is a partial exploded perspective view of a battery module without a cooling and venting unit according to an aspect of the present disclosure, FIG. 3 is a perspective view of the battery module according to an aspect of the present disclosure, and FIG. 4 is an exploded perspective view of the cooling and venting unit in the battery module of FIG. 3.

Referring to FIGS. 2 to 4, the battery module 10 according to an aspect of the present disclosure includes a cell assembly 100 including a plurality of stacked battery cells 111, a module case 200 and the cooling and venting unit 300.

Figure 1:
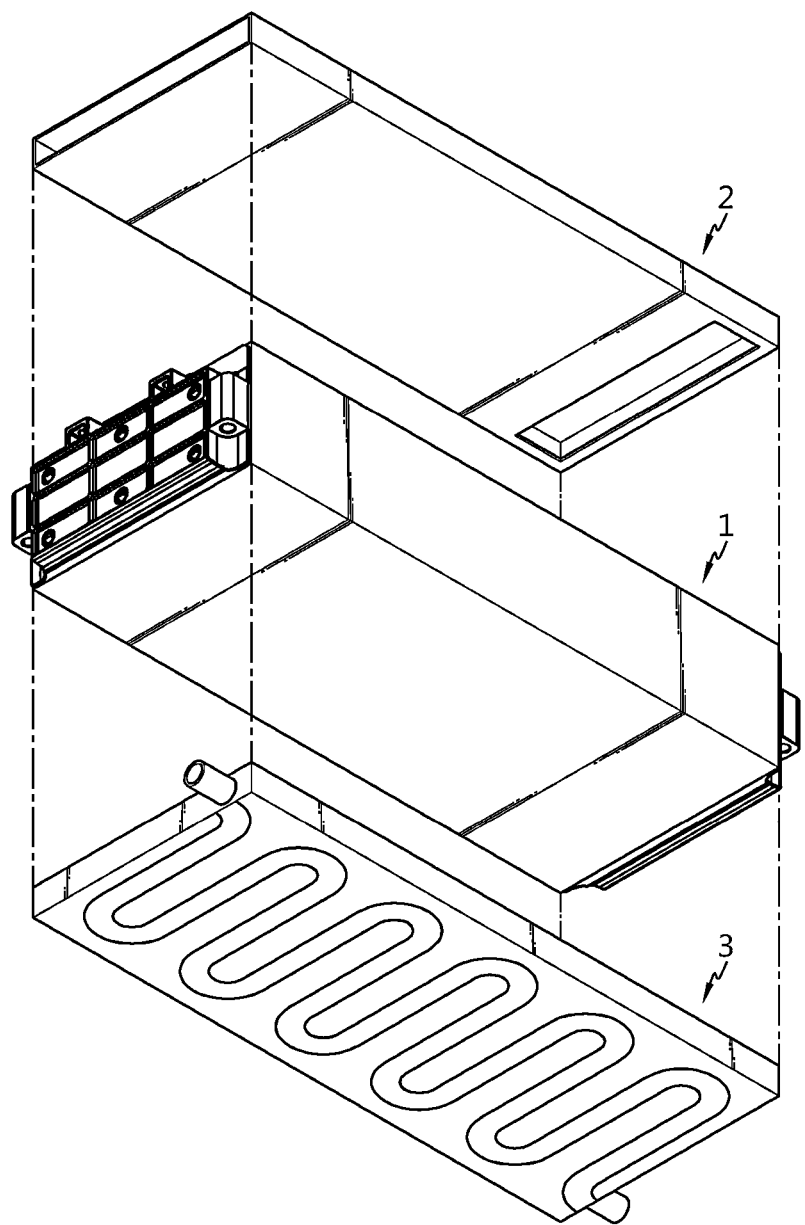
FIG. 1 is a diagram schematically showing a configuration of a battery module including a gas venting device and a cooling device according to the related art.

As described in detail below, the battery module 10 according to the present disclosure includes the cooling and venting unit 300 to dissipate heat from the battery module 10 and vent gas while preventing leakage of flames in the event of thermal runaway in the battery cells 111. In particular, the cooling and venting unit 300 according to the present disclosure may be a single component into which a cooling device 3 (referred to as a heat sink in the corresponding technical field) and a gas venting device 2 applied to the conventional battery module (see FIG. 1) are combined, and may perform a cooling function in normal situation and may be used as a gas vent passage when a thermal event occurs.

The battery module 10 with the cooling and venting unit 300 will be described in detail below.

As shown in FIG. 2, the battery module 10 includes the cell assembly 100 including the battery cells 111 and a busbar frame assembly for electrical connection of the battery cells 111 and the module case 200 accommodating the cell assembly 100.

The battery cell 111 may include a pouch type battery cell 111. The pouch type battery cell 111 is a battery cell including an electrode assembly, a pouch case accommodating the electrode assembly and a pair of electrode leads 112 connected to the electrode assembly, extended from the pouch case and serving as electrode terminals. The pair of electrode leads 112 may extend in opposite directions or the same direction in the lengthwise direction (±X direction) of the battery cells 111.

The pouch type battery cells 111 are stacked upright in a direction to form a cell stack 110 and the cell stack 110 is inserted into the module case 200 as shown in FIG. 2. Meanwhile, the pouch type battery cell 111 is an example of the battery cell 111 that may be received in the battery module 10. That is, any other type of battery cell may be received in the module case. For example, the battery cell that may be received in the module case may include any type of battery cell, for example, a cylindrical battery cell, a prismatic battery cell or the like.

The busbar frame assembly includes a busbar frame 120 and busbars 130.

The busbar frame 120 may be formed from an electrically insulating material by any suitable method such as injection molding and approximately in the shape of a plate covering the front or rear side of the cell stack 110, and may have a plurality of lead slots to insert and extract the electrode leads 112 of the battery cells 111 into/from the busbar frame 120.

The busbars 130 may be formed in the shape of a metal rod of an electrically conductive material such as, for example, copper, aluminum, nickel and may be fixedly mounted on the outer surface of the busbar frame 120. The busbars 130 may be disposed on the busbar frame 120 in the same direction as the stack direction of the battery cells 111, and the battery cells 111 may be connected in series and/or in parallel by welding the electrode leads 112 extracted from the busbar frame 120 through the lead slots to the corresponding busbars 130.

The module case 200 may be the component for protecting the cell assembly 100 from the external environment.

The module case 200 according to this aspect includes a case body 210 accommodating the cell assembly 100 and an end cover 220 covering the assembled portion of the busbar frame 120 and coupled to the case body 210. The module case 200 is made of a metal having high mechanical strength, but may be made of any material having high mechanical strength and heat resistance.

As shown in FIG. 2, the case body 210 may be formed in the shape of a rectangular tube including a top plate 211, a bottom plate 212 and two side plates 213, 214, and having two open ends in the lengthwise direction and a hollow center. The cell assembly 100 may be inserted into the case body 210 by sliding or interference fitting. Meanwhile, in this aspect, the case body 210 is formed in the shape of a rectangular tube by integrally forming the top plate 211, the bottom plate 212 and the two side plates 213, 214, but alternatively, for example, the case body 210 may be formed by combining the bottom plate 212 and the two side plates 213, 214 into a 'U-shaped frame' and welding the 'U-shaped frame' to the top plate 211. In this case, the cell assembly 100 is placed in the 'U-shaped frame', the top of the cell assembly 100 is covered with the top plate 211 and the edge of the top plate 211 is welded to the top of the 'U-shaped frame'.

The end cover 220 may be configured to cover the busbar frame assembly electrically connected to the electrode leads 112, and the edge may be coupled to the open end of the case body 210 by as suitable means, such as welding and/or snap-fitting. Additionally, for electrical insulation from the busbar frame assembly, the end cover 220 may be, for example, made of an insulating material on the inner side, or coated with an insulating sheet on the inner surface.

Meanwhile, the battery cell 111 generates heat by electrochemical reaction during charging/discharging, and in the event of thermal runaway, accompanied by abnormally rapid temperature rise, flames, sparks and gas may erupt from the battery cell 111 (sparks refer to high temperature particles including an electrode active material and aluminum particles). In this instance, when flames and sparks are released from the battery module 10, they may, for example, act on the other adjacent battery module 10 as a source of fire. Accordingly, it is necessary to prevent flames and sparks from leaking out of the battery module 10 to prevent fire from spreading. However, when gas is trapped in the battery module 10, the internal pressure rapidly rises, causing destruction or explosion of the battery module 10, and accordingly, it is necessary to properly vent gas out of the battery module 10.

The battery module 10 according to the present disclosure includes a gas venting hole 215 for gas venting in the event of thermal runaway in the battery cells 111. Specifically, the gas venting hole 215 may be disposed in the top plate 211 of the case body 210 as shown in FIG. 2. In the case of the pouch type battery cell 111, the surrounding temperature of the electrode leads 112 is highest during charging/discharging, and when thermal runaway occurs, there is a high likelihood that gas may be vented from the corresponding region. In this aspect, the gas venting hole 215 is disposed near the edge of the top plate 211 of the module case 200 close to the electrode leads 112 of the battery cells 111. Additionally, a metal mesh may be installed in the gas venting hole 215. The metal mesh may be used to block flames or sparks when gas passes through the gas venting hole 215.

Although this aspect shows one gas venting hole 215, a plurality of gas venting holes 215 may be provided, and may be disposed at locations that are different from this aspect.

The gas escaping in the upward direction from the module case 200 through the gas venting hole 215 may enter the cooling and venting unit 300 shown in FIG. 3, move along a gas venting channel 312 in the cooling and venting unit 300, and finally, exit through a gas outlet 317 of the cooling and venting unit 300.

In particular, the cooling and venting unit 300 is configured to cool the gas by indirect contact with cooling water while the gas moves along the gas venting channel 312. Accordingly, when the gas exits the battery module 10, since its temperature is not high, it may not cause serious thermal damage to the other adjacent battery module 10.

Hereinafter, the cooling and venting unit 300 will be described in more detail.

The cooling and venting unit 300 includes the gas venting channel 312 and a cooling channel 314 integrally formed in a single body, wherein the gas venting channel 312 is in communication with the gas venting hole 215 of the module case 200 and the cooling channel 314 forms a movement path of a cooling medium. The cooling and venting unit 300 is disposed on the outer side of the module case 200, i.e., the top plate 211 of the module case 200 in this aspect.

That is, as shown in FIGS. 3 and 4, the cooling and venting unit 300 may have a size corresponding to the top plate 211 of the module case 200, and may be mounted on the top plate 211 of the module case 200 such that a gas inlet 316 matches the gas venting hole 215 in the vertical direction. When the cooling and venting unit 300 is mounted on the top plate 211 of the module case 200, gas may enter the gas venting channel 312 through the gas inlet 316 from the gas venting hole 215, and exit through the gas outlet 317 opposite the gas inlet 316 along the gas venting channel 312.

The cooling channel 314 refers to a channel in which the cooling medium may flow, and has a spatially separated structure from the gas venting channel 312 to prevent the cooling medium from entering the gas venting channel 312. The cooling medium may include cooling water, and the cooling medium enters the cooling channel 314 of the cooling and venting unit 300 as indicated by C1 and C3 in FIG. 3, and like the exemplary configuration of FIG. 6, cools the battery cells by indirect contact with the battery cells 111 with the top plate 211 of the module case 200 interposed therebetween while moving along the cooling channel 314. Additionally, the cooling medium may leave the cooling and venting unit 300 as indicated by C2 and C4 in FIG. 3.

A cooling water supply pipe and a cooling water discharge pipe may be connected to a cooling medium inlet 301 and a cooling medium outlet 303 of the cooling channel 314, respectively. Additionally, heat from the battery module 10 may be transferred by the circulation of cooling water in this way "the cooling water supply pipe→the cooling channel 314→the cooling water discharge pipe→the heat exchanger→the cooling water supply pipe→the cooling channel 314".

As shown in FIG. 4, the cooling and venting unit 300 includes a channel plate 310 and a cover plate 320.

The gas venting channel 312 and the cooling channel 314 may be respectively disposed in two surfaces of the channel plate 310. For example, the channel plate 310 may be configured such that the upper surface is used as the gas venting channel 312 and the lower surface is used as the cooling channel 314. Additionally, the channel plate 310 has the gas inlet 316 through which a portion of the channel plate 310 corresponding to the gas venting hole 215 of the module case 200 in an area of contact with the top plate 211 of the module case 200 is open in the height direction. Additionally, the channel plate 310 may be made of a metal, and preferably, aluminum (Al) or an aluminum alloy having high thermal conductivity, stainless steel (SUS) based or ceramics based material having high heat resistance.

The cover plate 320 may be coupled or attached to the upper surface of the channel plate and configured to air-tightly close the gas venting channel. The cover plate 320 may be made of the same material as the channel plate 310, or for example, may be made of aluminum (Al) or an aluminum alloy having high thermal conductivity, stainless steel (SUS) based or ceramics based material having high heat resistance.

Figure 5:
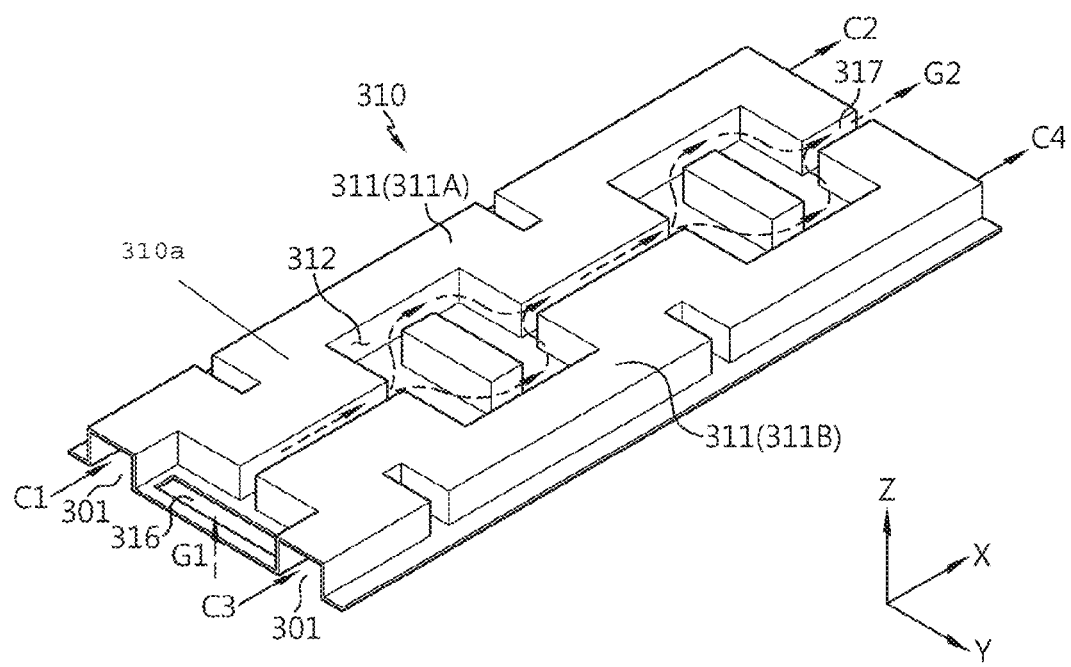
FIG. 5 is a diagram showing a first surface of a channel plate of FIG. 4.
Figure 6:
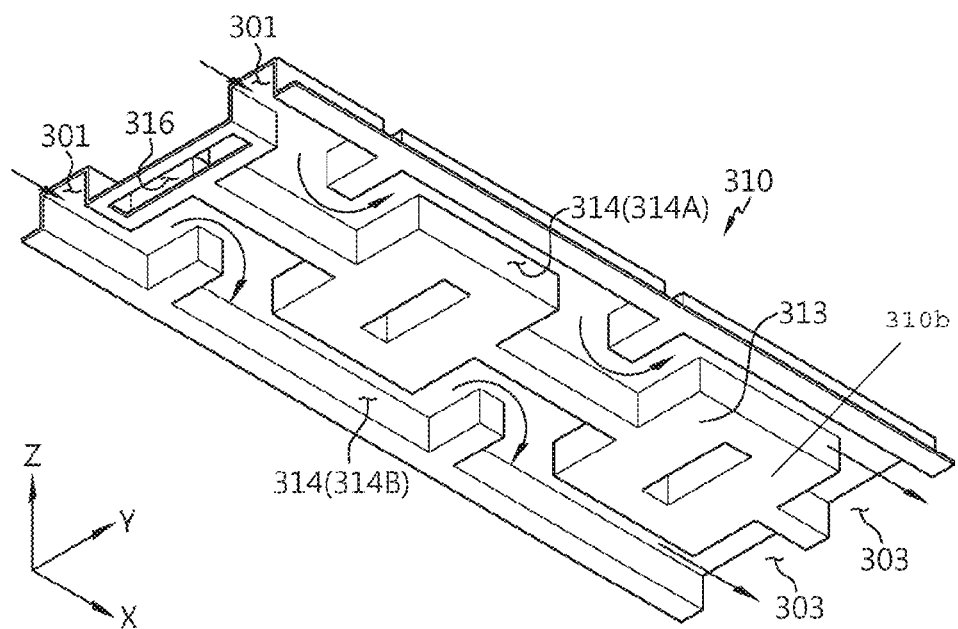
FIG. 6 is a diagram showing a second surface of a channel plate of FIG. 4.

More specifically, the channel plate 310 may include the gas venting channel 312 of the exemplary configuration as shown in FIG. 5 in a first surface 310a, and the cooling channel 314 in a second surface 310b opposite the first surface 310a as shown in FIG. 6.

The first surface 310a may include an embossed portion 311 convexly protruding in a predetermined area, and the gas venting channel 312 may be formed in an area surrounded by the embossed portion 311.

For example, the first surface 310a of the channel plate 310 may include a first embossed portion 311A and a second embossed portion 311B raised higher than the central region on two sides, and the first embossed portion 311A and the second embossed portion 311B may extend in a serpentine pattern along the lengthwise direction (X direction) of the channel plate 310. The gas venting channel 312 may be disposed in the central region surrounded by the first embossed portion 311A and the second embossed portion 311B. Additionally, convex parts may be added in the gas venting channel 312 to divide the flow of gas into branches.

The cover plate 320 may be attached to the first surface 310a to air-tightly close the open top of the gas venting channel 312. Specifically, the cover plate 320 of this aspect (see FIG. 4) may include a body portion 321 having an area corresponding to the first surface 310a and a bent portion 322 bent and extended downward from the edge of the body portion 321 and surrounding the upper part and the front side (−X direction) of the region in which the gas inlet 316 is present. Preferably, the cover plate 320 and the channel plate 310 may be coupled by welding to ensure sealability.

When the cover plate 320 is coupled to the channel plate 310, the gas venting channel 312 may be completely closed, except the gas inlet 316 located at one end of the channel plate 310 and the gas outlet 317 located at the other end. Accordingly, as indicated by G1 in FIG. 5, gas may enter the gas venting channel 312 through the gas inlet 316 from the gas venting hole 215 of the module case 200, move along the gas venting channel 312 and exit through the gas outlet 317 as indicated by G2. Meanwhile, as shown, the gas venting channel 312 is narrow in width and has the path extended in a serpentine pattern from one end of the channel plate 310 to the other end, which makes it difficult for flames or sparks to easily escape the gas venting channel 312.

Meanwhile, the cooling channel 314 may be formed in the second surface 310b opposite the embossed portion 311 of the first surface 310a of the channel plate 310 as shown in FIG. 6. In addition, the cooling channel 314 may be a region where the second surface 310b is concavely recessed along the shape of the embossed portion 311.

That is, the cooling channel 314 in the second surface 310b is disposed opposite the embossed portion 311 of the first surface 310a, and the gas venting channel 312 is disposed opposite a convex region 313 between a first cooling channel 314A and a second cooling channel 314B of the second surface 310b in the first surface 310a. For example, when a flat metal plate is stamped using a mold that is embossed in the same shape as the embossed portion 311, the gas venting channel 312 may be formed in one surface of the metal plate and the cooling channel 314 may be formed in the opposite surface like this aspect.

When the second surface 310b of the channel plate 310 having the cooling channel 314 is disposed facing the upper surface of the module case 200, the open lower part (−Z direction) of the cooling channel 314 may be covered by the upper surface of the module case 200. Accordingly, the remaining portion of the cooling channel 314 except the cooling medium inlet 301 and the cooling medium outlet 303 may be air-tightly closed. Here, the cooling medium inlet 301 refers to an entrance of the cooling channel 314 for allowing the cooling medium to enter the cooling channel 314, and the cooling medium outlet 303 refers to an exit of the cooling channel 314 for allowing the cooling medium to exit the cooling channel 314.

As shown in FIG. 6, a preset portion of the edges of the second surface 310b may be spaced apart from the upper surface of the module case 200 with a predetermined gap therebetween to form the cooling medium inlet 301 and the cooling medium outlet 303. That is, the cooling medium inlet 301 and the cooling medium outlet 303 may be formed by processing the portion of the two edges of the channel plate 310 along ±X direction so as to be in non-contact with the upper surface of the module case 200.

A connection port 302 may be mounted in each of the cooling medium inlet 301 and the cooling medium outlet 303. The connection port 302 may be used to easily connect an external pipe (not shown) to the cooling medium inlet 301 or the cooling medium outlet 303 and may be effective in improving sealability of the connected part.

By the cooling and venting unit 300 having the above-described configuration according to an aspect of the present disclosure, in a normal situation, cooling water may enter the cooling channel 314 through the cooling medium inlet 301 as indicated by C1, C3 in FIG. 5, and cool the battery module 10 while moving along the cooling channel 314 as shown in FIG. 6, thereby dissipating heat from the battery module 10.

Additionally, in the event of thermal runaway in the battery cells 111, gas may move upward from the gas venting hole 215 of the module case 200 as indicated by G1 in FIG. 5, enter the gas venting channel 312 through the gas inlet 316, move along the gas venting channel 312 and exit the cooling and venting unit 300 through the gas outlet 317. In this instance, since the channel plate 310 has been cooled down by the cooling water, gas may be cooled down while moving along the gas venting channel 312. Accordingly, because gas is vented out of the battery module 10 after it is cooled down to lower temperature, it may be possible to reduce fire risk of the other adjacent battery module 10 or structure caused by gas venting.

Subsequently, the battery module 10A according to another aspect of the present disclosure will be briefly described with reference to FIG. 7.

Figure 7:
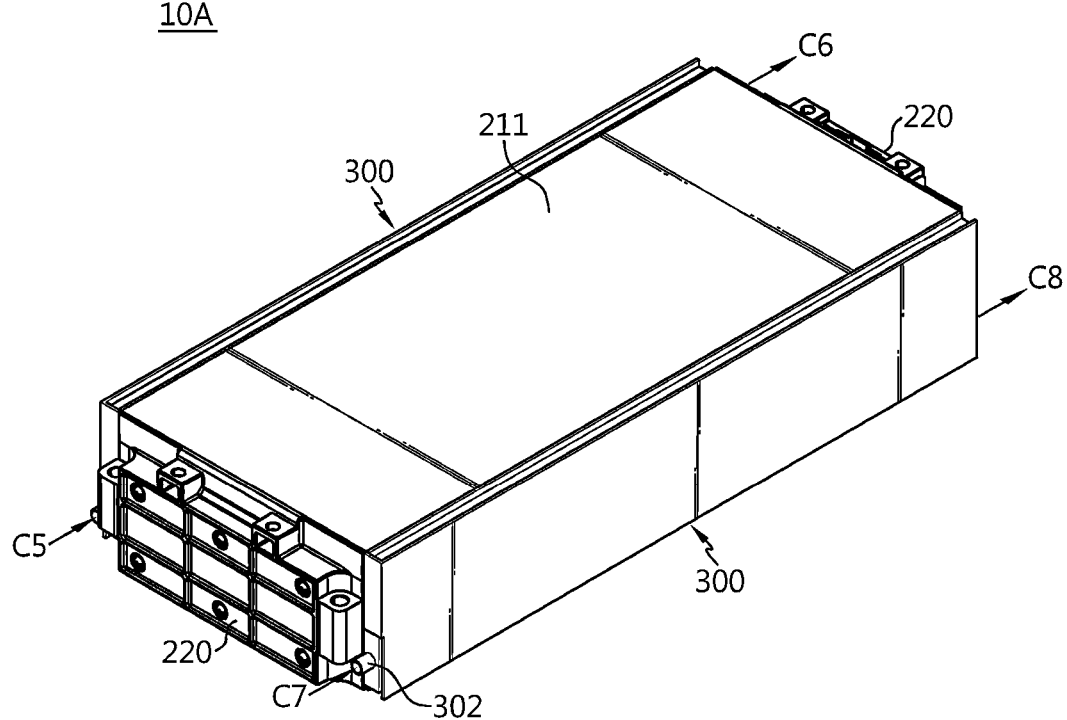
FIG. 7 is a perspective view of a battery module according to another aspect of the present disclosure.

FIG. 7 is a schematic perspective view of the battery module 10A according to another aspect of the present disclosure.

The same reference number as the previous drawings indicates the same element, and in the description of the same element, redundant description is omitted and difference(s) between this aspect and the above-described aspect will be described.

The battery module 10A according to another aspect of the present disclosure may include the cooling and venting unit 300 on at least one side of the module case 200. For example, the gas venting hole 215 may be formed on two sides of the module case 200 and as shown in FIG. 7, the cooling and venting unit 300 may be attached to the two sides of the module case 200. In this instance, the gas venting channel 312 and the cooling channel 314 of the cooling and venting unit 300 may change depending on the location and number of gas venting holes 215 formed on the side of the module case 200.

Additionally, the cooling and venting unit 300 of the above-described aspect has two cooling medium inlets 301 and two cooling medium outlets 303, while the cooling and venting unit 300 of this aspect may be configured to have one cooling medium inlet 301 and one cooling medium outlet 303. That is, (unlike the exemplary configuration of FIG. 6) the cooling and venting unit 300 attached to the left side of the module case 200 may be configured to allow cooling water to enter the cooling channel 314 through one cooling medium inlet 301 as indicated by C5 in FIG. 7, move along the cooling channel 314 and exit through one cooling medium outlet 303 as indicated by C6. Additionally, the cooling and venting unit 300 attached to the right side of the module case 200 may be configured to allow cooling water to enter the cooling channel 314 through one cooling medium inlet 301 as indicated by C7 in FIG. 7, move along the cooling channel 314 and exit through one cooling medium outlet 303 as indicated by C8.

Although the above-described aspects show examples of the cooling and venting unit 300 attached to the top and two sides of the module case 200, the scope of protection of the present disclosure is not limited thereto. That is, the cooling and venting unit 300 may be configured to attach to one side of the module case 200 or the bottom of the module case 200.

Hereinafter, a method for manufacturing the battery module 10 according to the present disclosure will be briefly described. As the process of manufacturing the battery module 10 has been widely known at the time the application was filed, for clarity of description, a certain description of the method for manufacturing the battery module 10 known in the corresponding technical field is omitted and the main technical feature will be described.

The method for manufacturing the battery module 10 according to the present disclosure includes the steps of receiving the plurality of battery cells 111 in the module case 200, preparing the cooling and venting unit 300 and coupling the cooling and venting unit 300 to the outer surface of the module case 200.

Figure 8:
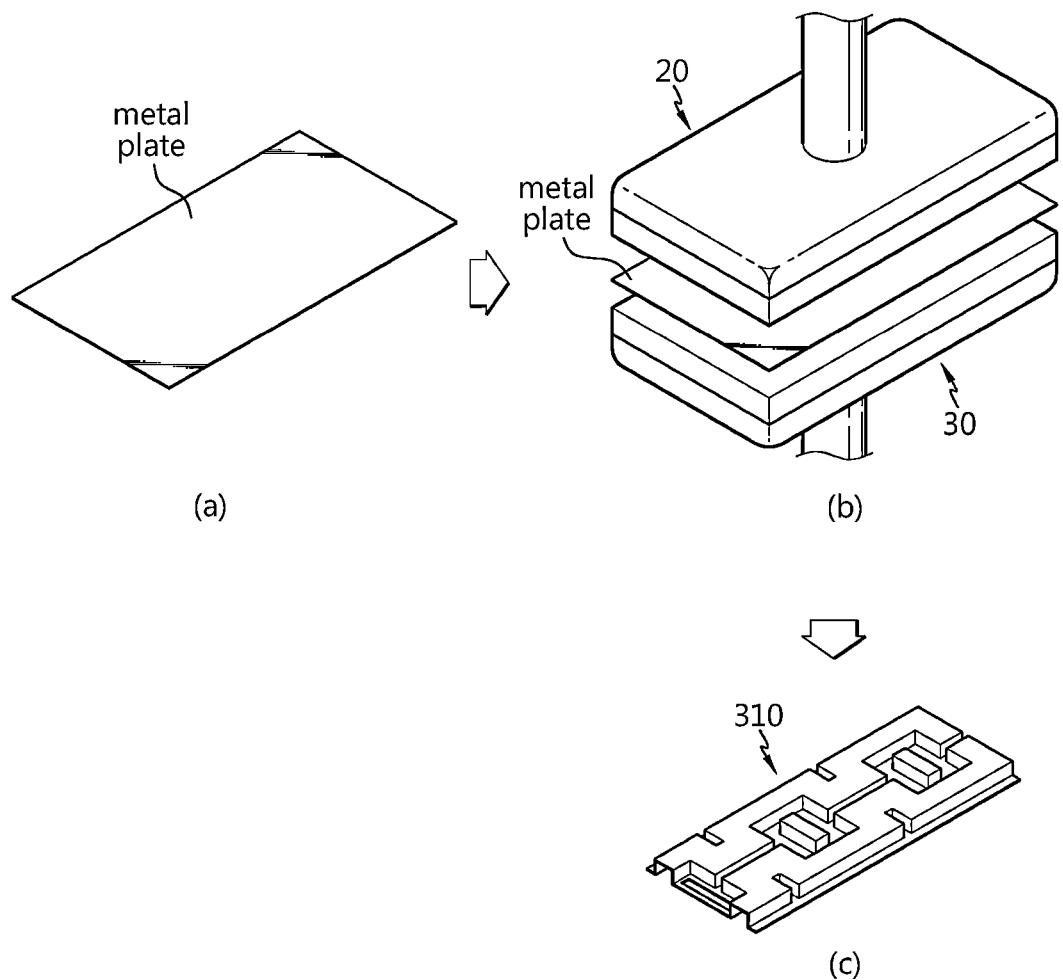
FIG. 8 is a flowchart of a process of forming a gas venting channel and a cooling channel, respectively, in a front surface and a rear surface of a metal plate according to the present disclosure.

As shown in FIG. 8, the step of preparing the cooling and venting unit 300 includes a stamping process of placing a flat metal plate between an upper mold 20 and a lower mold 30, and pressing the metal plate in the vertical direction using the upper mold 20 and the lower mold 30 to form the gas venting channel 312 in one surface of the metal plate and forming the cooling channel 314 in the opposite surface of the metal plate so as to form the channel plate 310.

Here, any one of the upper mold 20 and the lower mold 30 has an embossed surface along a predesigned shape, and the other has a corresponding recessed surface. Additionally, the predesigned shape refers to an intended shape of the gas venting channel 312 or the cooling channel 314.

When the forming of the channel plate 310 is completed, a process for attaching the cover plate 320 to one surface of the channel plate 310 may be performed. Preferably, the cover plate 320 is attached to the first surface 310a of the channel plate 310 serving as the gas venting channel 312. In this instance, the cover plate 320 and the channel plate 310 may be attached by any suitable means, for example, coupled to each other by welding.

When the cooling and venting unit 300 is prepared, a process of attaching the cooling and venting unit 300 to the outer surface of the module case 200 having the gas venting hole 215 is performed using any suitable means, such as welding, bolting, hooking or adhesion.

As described above, the gas venting device and the cooling device present as two distinct components in the conventional battery module 10 may be formed into a single component by combining the gas venting channel 312 and the cooling channel 314 into the channel plate 310 through the stamping process, and attaching the cooling and venting unit 300 including the channel plate 310 and the cover plate 320 to the outer surface of the module case 200.

Meanwhile, a battery pack according to the present disclosure may include at least one battery module 10. The battery pack according to the present disclosure may further include a master Battery Management System (BMS) for comprehensively controlling the charge/discharge of the at least one battery module 10, a current sensor, a fuse or the like and a pack case accommodating the above-described components.

The battery pack according to the present disclosure may be used in energy storage device applications, or automotive applications such as electric scooters, electric vehicles or electric hybrid vehicles.

While the present disclosure has been hereinabove described with regard to a limited number of aspects and drawings, the present disclosure is not limited thereto and it is apparent that a variety of changes and modifications may be made by those skilled in the art within the technical aspect of the present disclosure and the scope of the appended claims and their equivalents.

The terms indicating directions such as upper, lower, left, right, front and rear are used for convenience of description, but it is obvious to those skilled in the art that the terms may change depending on the position of the stated element or an observer.

What is claimed is:

1. A battery module, comprising:
   a plurality of battery cells;
   a module case accommodating the plurality of battery cells and having a gas venting hole on at least one side;
   channel plate including a gas venting channel in a first surface and a cooling channel in a second surface opposite the first surface integrally formed in a single body, and disposed on an outer side of the module case, the channel plate having an open bottom below the cooling channel; and
   a cover plate coupled to the channel plate,
   wherein the gas venting channel forms a movement path of gas in communication with the gas venting hole, and the cooling channel forms a movement path of a cooling medium, and
   wherein the module case closes the open bottom in the channel plate.

2. The battery module according to claim 1, wherein the first surface of the channel plate has an embossed portion convexly protruding in a predetermined area, and the gas venting channel is provided in an area surrounded by the embossed portion.

3. The battery module according to claim 2, wherein the cooling channel is formed in the second surface of the channel plate opposite the embossed portion of the first surface, and is a region which is concavely recessed from the second surface along a shape of the embossed portion.

4. The battery module according to claim 1, wherein the channel plate is made of a metal.

5. The battery module according to claim 2, wherein the cover plate covers the first surface of the channel plate.

6. The battery module according to claim 5, wherein the channel plate has a gas inlet, through which a portion of the channel plate contacting the outer surface of the module case is open in a thicknesswise direction, so that the gas inlet overlaps the gas venting hole of the module case.

7. The battery module according to claim 6, wherein the gas inlet and the gas venting channel are in communication with each other, and
   wherein the gas venting channel has a path which is extended in a serpentine pattern from a first end of the channel plate to a second end of the channel plate and a gas outlet in communication with an outside of the module case is provided at the second end of the channel plate.

8. The battery module according to claim 5, wherein the cooling channel includes a cooling medium inlet on a first side of the cooling channel and a cooling medium outlet on a second side of the cooling channel.

9. The battery module according to claim 8, wherein the cooling medium inlet or the cooling medium outlet is formed by a gap between a preset portion of edges of the second surface and the outer surface of the module case.

10. The battery module according to claim 1, wherein the channel plate is coupled to a top of the module case.

11. The battery module according to claim 1, wherein the channel plate is coupled to at least one side of the module case.

12. A battery pack comprising the battery module according to claim 1.

13. A method for manufacturing the battery module defined in claim 1, comprising:
    receiving the plurality of battery cells in the module case;
    preparing the channel plate; and
    coupling the channel plate to an outer surface of the module case,
    wherein the preparing of the channel plate includes a stamping process of placing a flat metal plate between an upper mold and a lower mold, and pressing the metal plate in a vertical direction using the upper mold and the lower mold to form the gas venting channel in the first surface of the metal plate and the cooling channel in the second surface of the metal plate so as to form the channel plate.

14. The method for manufacturing the battery module according to claim 13, wherein the preparing of the channel plate further includes a process of attaching a cover plate to the first surface of the channel plate, and
    wherein the coupling includes a process of attaching the channel plate to the outer surface of the module case having the gas venting hole using at least one coupling method of welding, bolting, hooking or adhesion.

15. The battery module according to claim 1, wherein the gas venting channel includes a first section and a second section, the second section being wider than the first section, and
    wherein a protrusion is formed in the second section to form two branches in the second section.

16. The battery module according to claim 1, wherein the cooling channel has a pair of inlets, and
    wherein the cover plate has a bent portion extending downwardly from an edge of the cover plate, the bent portion being between the pair of inlets.

17. The battery module according to claim 16, further comprising a gas inlet between the pair of inlets, wherein the bent portion forms a front surface of the gas venting channel.

18. The battery module according to claim 1, wherein the channel plate has an open top above the gas venting channel, and
wherein the cover plate closes the open top to form a top surface of the gas venting channel.

19. The battery module according to claim 1, wherein the cooling channel has an inlet, and
wherein a connection port covers the inlet, the connection port configured to connect to a cooling medium supply line.

\* \* \* \* \*